United States Patent
Aamodt

(10) Patent No.: US 11,788,011 B2
(45) Date of Patent: Oct. 17, 2023

(54) FIRE RETARDANT AND FUEL DECOMPOSITION COMPOSITIONS AND METHODS

(71) Applicant: Wildfire Alliance, Inc., Bethesda, MD (US)

(72) Inventor: James A. Aamodt, Hood River, OR (US)

(73) Assignee: Wildfire Alliance, Inc., Bethesda, MD (US)

( * ) Notice: Subject to any disclaimer, the term of this patent is extended or adjusted under 35 U.S.C. 154(b) by 0 days.

(21) Appl. No.: 18/107,175

(22) Filed: Feb. 8, 2023

(65) Prior Publication Data

US 2023/0183576 A1    Jun. 15, 2023

Related U.S. Application Data

(63) Continuation of application No. 17/805,841, filed on Jun. 7, 2022, now Pat. No. 11,603,495.

(60) Provisional application No. 63/208,314, filed on Jun. 8, 2021.

(51) Int. Cl.
   *C09K 21/14*    (2006.01)
   *C05F 17/20*    (2020.01)

(52) U.S. Cl.
   CPC .............. *C09K 21/14* (2013.01); *C05F 17/20* (2020.01)

(58) Field of Classification Search
   CPC ..................................................... C09K 21/14
   See application file for complete search history.

(56) References Cited

FOREIGN PATENT DOCUMENTS

CN    110240524 A  *  9/2019

OTHER PUBLICATIONS

English machine translation of Yan CN 110240524 A. (Year: 2019).*

* cited by examiner

*Primary Examiner* — Peter F Godenschwager
(74) *Attorney, Agent, or Firm* — Culhane Meadows PLLC; Scott C. Sample

(57) ABSTRACT

Fire retardant and fuel decomposition compositions that include at least one compost accelerator, at least one deliquescent, at least one polymer, at least one fire retardant, at least one polymer, and at least one wetting agent are provided. In one example, the composition includes at least one fire retardant is in a range of 50-75 weight percent, at least one deliquescent is in a range of 5-20 weight percent, at least one polymer is in a range of 0.5-2 weight percent, at least one compost accelerator is in a range of 0.5-2 weight percent, and at least one wetting agent is in a range of 0.1-1 weight percent.

15 Claims, No Drawings

FIRE RETARDANT AND FUEL DECOMPOSITION COMPOSITIONS AND METHODS

CROSS-REFERENCE TO RELATED APPLICATION

This application is a continuation of U.S. application Ser. No. 17/805,841, filed Jun. 7, 2022, and claims priority to U.S. Provisional Application No. 63/208,314 filed on Jun. 8, 2021, the contents of both of which are incorporated fully herein by reference.

TECHNICAL FIELD

The present disclosure describes novel flame retardant and fuel decomposition compositions for preventing or reducing the threat of fires. More particularly, but not by way of limitation, the present disclosure describes compositions and methods that improve the decomposition and inhibit the combustion of organic fuels.

BACKGROUND

Every year, devastating wildfires burn across the United States. At the same time, a growing number of people are living where wildfires are a constant danger. Research around home destruction versus home survival in wildfires point to embers and small flames as the main way that the majority of homes ignite in wildfires. Embers are burning pieces of airborne wood and/or vegetation that can be carried more than a mile through the wind can cause spot fires and ignite homes, debris and other objects.

Experiments, models and post-fire studies have shown homes ignite due to the condition of the home and everything around it, up to 200 feet from the foundation. This area is called the Home Ignition Zone (HIZ). Flammable material within the HIZ include vegetation and plant material such as mulch, flammable plants, leaves, needles, firewood piles and grasses. Moreover, ladder fuels (i.e., vegetation under trees) also pose a concern as they ignite and drift, or worse, reach the crown and combust.

Two general methods of reducing the potential damage from the burning of combustible materials include preventative treatment and active firefighting. Preventive treatment with a flame retardant may reduce the flammability of a material and the resulting damage. Flame retardants, however, present several shortcomings and there remains a need for compositions for reducing fuel availability. Compositions that improve the degradation of organic matter to lessen the overall fuel burden is needed.

SUMMARY OF THE INVENTION

The present disclosure relates to novel flame retardant and fuel decomposition compositions and methods that enhance the decomposition of organic matter thereby reducing the fuel availability and fire threat.

In one example, the fire retardant composition comprises at least one retardant, at least one deliquescent, at least one polymer, at least one plant nutrient, at least one wetting agent, at least one rheological modifier, and at least one compost accelerator. In some aspects, the composition may also include at least one bio protectant. In another aspect, the composition may include at least one colorant. In yet another aspect, the fire retardant composition comprises 50-80 weight percent retardant, 5-20 weight percent deliquescent, 1-2 weight percent polymer, 1-2 weight percent plant nutrient, 0.2-1 weight percent wetting agent, 0.5-0.1 weight percent rheological modifier and 0.5-3 weight percent compost accelerator. In one aspect, the composition may further include a bio protectant in an amount of about 0.5-1 weight percent.

In another example, a method of reducing combustible material surrounding a structure is provided comprising applying a fire retardant composition comprising water, a retardant, a deliquescent, a polymer, a plant nutrient, a wetting agent, a rheological modifier, and a compost accelerator to at least a portion of the perimeter of the structure. In one aspect, the portion comprises organic matter.

In yet another example, a fuel decomposition composition is provided that comprises at least one compost accelerator, at least one polymer, at least one deliquescent, and at least one plant nutrient. In one aspect, the at least one compost accelerator is in the range of 0.01-0.5 weight percent, the polymer is in the range of 0.25-15 weight percent, the at least one deliquescent is in the range of 0.5-40 weight percent, and the at least one plant nutrient is in the range of 0.25-10 weight percent.

In another example, a fuel decomposition composition is provided that comprises at least one compost accelerator, at least one polymer, at least one deliquescent, and at least one plant nutrient. In one aspect, the at least one compost accelerator is in the range of 0.01-0.5 weight percent. In another aspect, the at least one compost accelerator may include saprophytic microbes and/or spores. In another aspect, the at least one polymer is in the range of 0.25-15 weight percent and may comprise at least one of potassium polyacrylate and cornstarch. In another aspect, the at least one deliquescent is in the range of 0.5-40 weight percent and may comprise at least one of soy flour and potassium citrate. In yet another aspect, the at least one plant nutrient is in the range of 0.25-10 weight percent and may comprise at least one of monosaccharides and disaccharides. In additional aspects the fuel decomposition composition has a pH between 6 and 9. The fuel decomposition composition increases the rate of decomposition of organic matter.

DETAILED DESCRIPTION

The present disclosure relates to compositions and methods that not only will inhibit fuel combustion but will also reduce amount of fuel available for combustion.

In one example, the fire retardant composition comprises water, a retardant, a deliquescent, a polymer, a plant nutrient, a wetting agent, a rheological modifier, and a compost accelerator.

The fire retardant and fuel decomposition compositions may include a retardant compound or composition for inhibiting the combustion of cellulosic materials by chemically altering combustible fuels by promoting vapor phase inhibition, solid phase char formation and quenching cool systems.

Compounds contemplated for use as fire retardants include ammonium phosphate, mono ammonium phosphate, sodium phosphate potassium phosphate, calcium phosphate, potassium citrate, and mono potassium phosphate, or a combination of one or more. In one example, the fire retardant composition comprises 50-80 weight percentage of retardant. As used herein, weight percent refers to the weight-weight percentage and may be denoted as "weight percent", "wt %", or "w/w %". In some aspects of the invention, the composition may comprise a retardant in a final weight percentage of the total composition of about 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, or any ranges therebetween including, for example, about 50-60%, 60-70%, and 70-80%. In some aspects, the retardant is preferably in the range of 50-70 or 60-75 weight percent of the total composition.

The fire retardant and fuel decomposition compositions include a deliquescent compound or composition which attracts and liquefies ambient humidity, keeps combustibles damp thereby reducing flammability and provides moisture to accelerate and promote the growth of saprophytic organisms. Suitable deliquescents include calcium chloride, magnesium chloride, zinc chloride, ferric chloride, carnallite, potassium carbonate, potassium phosphate, ferric ammonium citrate, potassium hydroxide, sodium hydroxide, potassium citrate, mono potassium phosphate, and soy flour. In one example, the fire retardant composition comprises 5-20 weight percentage of deliquescent. In some aspects of the invention, the composition may comprise a deliquescent in a final weight percentage of the composition of about 5%, 6%, 7%, 8%, 9%, 10%, 11%, 12%, 13%, 14%, 15%, 16%, 17%, 18%, 19%, 20%, or any ranges therebetween including, for example, about 5-10%, 10-15%, and 15-20%. In some aspects, the deliquescent is in the range of 5-12 or 10-20 weight percent of the total composition.

The fire retardant and fuel decomposition compositions may include at least one polymer to provide moisture to accelerate and promote the growth of saprophytic organisms by retaining moisture harvested by the deliquescent. Suitable polymers include potassium polyacrylate, polyacrylamide copolymers, and sodium polyacrylate. In some aspects, the polymers used, in particular sodium polyacrylate, have a grain size of less than 1 mm. The term "copolymer" as used herein is not limited to the combination of two polymers, but includes any combination of polymers, e.g., terpolymers. In one example, the polymer is a water-absorbent polymer. In one aspect, the polymer is water-absorbent and biodegradable. In another aspect, the water-absorbent and/or biodegradable polymer is not derived from starch. In another aspect, the water-absorbent polymer is a plant-derived water-absorbent polymer. In a further aspect, plant-derived water-absorbent polymer includes one or more of a starch, corn starch, chitosan, citric acid, urea, glycoside, and gluten. In another aspect, the polymer is polyglutamate or a derivative thereof. In one example, the composition includes about 0.1-2% of the polymer or combination thereof.

The fire retardant and fuel decomposition compositions may also include one or more plant nutrients that balance the nutritional load of nitrogen, phosphates, and potassium from the retardants. When applied to combustibles and then through drip migration to surrounding soil these nutrients will promote healthy plants in the application zone. Suitable plant nutrients include calcium, magnesium, sulfur, chlorine, manganese, molybdenum, nickel, chromium, fluorine, iron, copper, boron, and zinc. Additional plant nutrients include simple sugars such as monosaccharides and disaccharides. In one example, the one or more plant nutrients are in the range of 1 to 2 weight percent of the fire retardant and/or fuel decomposition compositions.

The fire retardant and fuel decomposition compositions may also include one or more wetting agents. Wetting agents provide a binding layer and break the surface tension between the active solution and the surface of combustibles that allows for increased penetration and long term retention of the composition on the surface of combustibles. The term "wetting agents" as used herein refers to surface-active substances, such as a detergent, emulsifiers, surfactants, dispersants, and foaming agents. Suitable wetting agents for use with the inventive compositions include, but are not limited to, saponins, fulvic acid, sarcosinates, glutamates, sodium alkyl sulfates, ammonium alkyl sulfates, sodium alkyl ether sulfates, ammonium alkyl ether sulfates, ammonium laureth-n-sulfates, sodium laureth-n-sulfates, isothionates, glycerylether sulfonates, sulfosuccinates and combinations thereof where an anionic surfactant is desired, suitable anionic surfactants that may be used include, but are not limited to, sodium lauryl sarcosinate, monosodium lauroyl glutamate, sodium alkyl sulfates, ammonium alkyl sulfates, sodium alkyl ether sulfates, ammonium alkyl ether sulfates, citric acid, ethylenediamine-tetraacetate, sodium meta-phosphate, succinic acid, urea, *yucca* powder, cyclodextrin, polyvinylpyrrolidone, cyclodextrins diethylammonium-orthobenzoate, and combinations thereof.

The fire retardant and fuel decomposition compositions may also include one or more rheological modifier which allow the composition to adhere to the surface of combustibles and presents a superior spray control and coverage during application—Agar, guar gum, powdered kelp. As used herein "rheological modifier" refers to an agent that allows the composition to adhere to the surface of combustibles and presents a superior spray control and coverage during application. Suitable rheological modifiers include polyvinylpyrrolidone, polyvinylpyrrolidone/vinyl acetate copolymers, petrolatum, white petrolatum, shellac, polyisobutene, polyvinylpyrrolidone/vinyl acetate copolymers, and insoluble polyacrylate copolymers. Suitable rheological modifiers further include xanthan, guar, pectins, gums, guar derivatives, chitosan, dextran, maltodextrin, carrageenans, starch, polyethylene glycol, albumin, cellulose ethers, hyaluronic acid, carboxymethylhydroxyethylcellulose, hydroxypropyl cellulose, gelatins, vinyl acetates, polyvinyl pyrrolidone-vinyl acetate copolymers, polyvinyl alcohols, polyphosphoesters, N-(2-hydroxypropyl) methacrylamide (HPMA) copolymers, polyacrylic acids, polyacrylamides, polyoxazolines, divinyl ether-maleic anhydride, polyphosphazenes, including derivatives and substitutions, and combinations thereof. In another aspect, the rheological modifier is a cellulose that includes one or more of hydroxypropylmethyl cellulose (HPMC), hydroxypropyl cellulose (HPC), hydroxyethyl cellulose (HEC), and sodium carboxy methyl cellulose (Na-CMC). In yet another aspect, the rheological modifier is powdered seaweed.

The fire retardant and fuel decomposition compositions may also include one or more compost accelerators. The compost accelerators may include living organisms or nutrients. Microbes such as fungi and sporulated bacteria are added to cellulosic materials to accelerate the decomposition of the combustibles. Particularly suitable microbes include saprophytic fungi and bacteria, actinomycetes bacteria psychrophilic bacteria, and mesophilic bacteria. To further accelerate decomposition of combustibles, combustibles may be subsequently and additionally treated with one or more compost accelerator. In one aspect, the combustibles may be additionally treated with microbes and/or spores. In another aspect, the combustibles may be additionally treated with the nutrient compost accelerators to support microbial growth may also be added, such as nitrogenous compounds such as ammonia salts.

Optionally, the fire retardant and fuel decomposition compositions may also include a bio protectant. The bio protectant may be impregnated with one or more compost accelerators. In one aspect, the bio protectant protects and preserves the living microbes from exposure to the concentrated actives while in storage. Suitable bio protectants include any microporous minerals, aggregates, and the like. For example, aluminosilicate minerals such as zeolites, including but not limited to analcime, chabazite, clinoptilolite, heulandite, natrolite, phillipsite, stilbite, or combinations thereof, are suitable. Other suitable bio protectants include activated carbons, such as activated charcoal, coal, and/or coke. Another suitable bio protectant is bentonite clay.

The composition may also include a colorant. In an example where the composition comprises a colorant, such as a pigment or dye or a combination thereof may be used. The colorant(s) are preferably incorporated in the compositions at a concentration of 0.1 to 5% by weight and more preferably 0.5 to 2.5% by weight.

In another example, the fire retardant composition comprises at least one retardant, at least one polymer, at least one wetting agent, and at least one compost accelerator. In one aspect, the at least one retardant is at least 95 weight percent of the composition. In another aspect, the polymer is at least 0.5 weight percent of the composition. In yet another aspect, the at least one retardant is about 98 weight percent of the composition and includes ammonium phosphate, potassium citrate, or both. In another aspect, the polymer is about 1-2 weight percent of the composition and includes potassium polyacrylate. In yet another aspect, the wetting agent is about 0.03 weight percent of the composition and includes *yucca* powder. In still another aspect, the compost accelerator is about 0.5 to 0.6 weight percent of the composition and includes a bacteria, a fungus, or both.

In yet another example, the fuel decomposition composition comprises at least one deliquescent, at least one polymer, at least one plant nutrient, at least one wetting agent, at least one rheological modifier, and at least one compost accelerator. In one aspect, the at least one deliquescent comprises at least 80 weight percent, 80-95 weight percent, 80-90 weight percent, 85-95 weight percent, and 85-90 weight percent of the composition. In one aspect, the at least one polymer comprises 2-5 wt % of the composition. In another aspect, the polymer is a plant-based biopolymer. In one aspect, the at least one plant nutrient comprises 0.1-20 weight percent, including 0.1-5, 5-10, 10-15, or 15-20 weight percent. In one aspect the at least one wetting agent comprises 0.5-1 weight percent. In another aspect, the rheological modifier comprises 0-1 weight percent. The compost accelerator comprises 0.5-2 weight percent of the composition. The bio protectant comprises 0.5-2 weight percent.

In another example, a method of reducing combustible material is provided. In one aspect, the method includes applying a composition described herein to an area comprising combustible material. In one aspect the area includes a combustible structure. In one aspect, the area includes organic matter. In another aspect, compost accelerators may be added separately, either before or after the initial application of other components of the composition.

In yet another example, a fuel decomposition composition is provided that comprises at least one compost accelerator, at least one polymer, at least one deliquescent, and at least one plant nutrient. In one aspect, the at least one compost accelerator is in the range of 0.01-0.5 weight percent, the polymer is in the range of 0.25-15 weight percent, the at least one deliquescent is in the range of 0.5-40 weight percent, and the at least one plant nutrient is in the range of 0.25-10 weight percent.

In some aspects, the final weight percentage of the at least one compost accelerator is 0.005, 0.01, 0.02, 0.025, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 2.0, or 3.0 weight percent, or any range therebetween including, for example, about 0.02-0.2, 1.0-2.0, or 1.0-3.0 weight percent. In some aspects the at least one compost accelerator is in the range of 0.025-0.1 weight percent. In some aspects the at least one compost accelerator is in the range of 0.05-0.1 weight percent.

In some aspects, the final weight percentage of the at least one polymer is 0.1, 0.2, 0.3, 0.4, 0.5, 0.6, 0.7, 0.8, 0.9, 1.0, 1.5, 2, 2.5, 3, 4, 5, 6, 7, 8, 9, 10, 11, 12, 13, 14, or 15 weight percent, or any range therebetween including, for example, about 0.03-0.5, about 0.5-6, and about 6.0-9.0 weight percent. In some aspects, the at least one polymer is in the range of 0.5-9 weight percent. In some aspects, the at least one polymer is in the range of 4.5-9 weight percent.

In some aspects the at least one polymer is an absorbent plant-derived polymer. In some aspects the absorbent plant-derived polymer is cornstarch as described above.

In some aspects, the final weight percentage of the at least one deliquescent is 0.5, 1.0, 1.25, 1.5, 2, 3, 4, 5, 10, 15, 20, 25, 30, 35, and 40 weight percent, or any range therebetween including, for example, about 1.0-10, about 10-20, or about 20-30 weight percent. In some aspects the at least one deliquescent is in the range of 1.25-30 weight percent. In some aspects the deliquescent includes soy flour, potassium citrate, or both.

In some aspects, the final weight percentage of the at least one plant nutrient is 0.5, 0.6, 0.7, 0.8, 0.9, 1.0, 1.5, 2, 2.5, 3, 3.5, 4, 4.5, or 5 weight percent, or any range therebetween including, for example, about 0.5-1, 1.0-2.0, and 2.0-3.0 weight percent. In some aspects the at least one plant nutrient is in the range of 0.75-3 weight percent. In some aspects the at least one plant nutrient is in the range of 0.1.5-3 weight percent.

In some aspects the fuel decomposition composition further comprises at least one retardant. In some aspects, the final weight percentage of the at least one retardant is 1.0, 2.0, 3.0, 4.0, 5.0, 10, 15, or 20 weight percent. or any range therebetween including, for example, about 1.0-5.0, 5-10, or 10-15 weight percent. In one aspect the at least one retardant is in the range of 2-15 weight percent. In another aspect the retardant is in the range of 5-11 weight percent.

In some aspects fuel decomposition composition further comprises at least one wetting agent and at least one rheological modifier.

In some examples, the fuel decomposition composition comprises at least one compost accelerator of about 0.5 weight percent, at least one polymer of about 4.5 weight percent, at least one deliquescent of about 3 weight percent, and at least one plant nutrient of about 1.5 weight percent of the final composition.

In some examples, the pH of the fuel decomposition composition comprises a pH adjuster. The pH adjuster is added to adjust the pH of the composition to a pH in the range of 6-9.

In all examples the final aqueous solution prepared by mixing the retardant composition described herein with a solvent such as water increases the rate of decomposition of organic matter, thereby reducing the amount of organic matter available as fuel or duff.

In another example, a fuel decomposition composition is provided that comprises at least one compost accelerator, at least one polymer, at least one deliquescent, and at least one plant nutrient. In one aspect, the at least one compost accelerator is in the range of 0.01-0.5 weight percent. In another aspect, the at least one compost accelerator may include saprophytic microbes and/or spores. In another aspect, the at least one polymer is in the range of 0.25-15 weight percent and may comprise at least one of potassium polyacrylate and cornstarch. In another aspect, the at least one deliquescent is in the range of 0.5-40 weight percent and may comprise at least one of soy flour and potassium citrate. In yet another aspect, the at least one plant nutrient is in the range of 0.25-10 weight percent and may comprise at least one of monosaccharides and disaccharides. In additional aspects the fuel decomposition composition has a pH between 6 and 9. The fuel decomposition composition increases the rate of decomposition of organic matter.

EXAMPLES

The following examples are put forth so as to provide those of ordinary skill in the art with a complete disclosure and description of how to make and use the described invention, and are not intended to limit the scope of what the inventors regard as their invention nor are they intended to represent that the experiments below are all or the only experiments performed. Those of skill in the art should, in light of the present disclosure, will appreciate that many changes can be made in the specific examples which are disclosed and still obtain a like or similar result without departing from the spirit and scope of the invention. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight temperature is in degrees Centigrade, and pressure is at or near atmospheric.

Example 1

| Class | Compound(s) | Wt. % |
| --- | --- | --- |
| Retardant | Monoammonium Phosphate | 80 |
| Deliquescent | Potassium citrate (calcium chloride less good) | 18 |
| Polymer | Plant-based biopolymer | 0.5-2 |
| Plant nutrient | Magnesium | 0.1-1 |
| Wetting agent | Yucca powder | 0.1-2 |
| Rheological modifier | Seaweed powder | 0.1-2 |
| Compost accelerator | Saprophytic fungi and bacteria | 0.5-2 |
| Bio protectant | Activated charcoal | 0.5-2 |

The above mixture is added to water in the ratio of 1.14 to 1.5 pounds per gallon to create a sprayable mixture. The composition is applied to accumulated duff, dormant and dead cellulose plant matter and ladder fuels located within 10 feet of the foundation of a structure until saturated. All treated materials will be rendered non-flammable when challenged by flame and continue to be non-flammable after 1 year if protected from rain and overhead irrigation. The composition is applied to an area until the plant matter is saturated with the composition.

Example 2

| Class | Compound(s) | wt. % |
| --- | --- | --- |
| Retardant(s) | Mono Ammonium Phosphate | 80 |
| | Potassium Citrate | 18 |
| Polymer | Potassium polyacrylate | 1.17 |

-continued

| Class | Compound(s) | wt. % |
| --- | --- | --- |
| Wetting agent | Yucca powder | 0.03 |
| Compost accelerator | Saprophytic fungi and bacteria | 0.55 |

Fifty pounds of the of Example 2 was mixed with 43.9 gallons of water to form a final composition, using the 1.14 pounds per gallon of water mix ratio. The composition was applied using a garden backpack sprayer to 6 foot diameter, 6 inch deep piles about 10 pounds in weight, of duff and straw, all combustible material. The spray was applied in an amount sufficient to make the cellulose materials dripping wet, then allowed to dry. It was observed that tiny amounts of the dried salts were visible as whitish deposits on the cellulose materials. All cellulose materials sprayed were rendered non-flammable when challenged by flame. After 4 weeks the accelerated decay evidence of the black spots and fungus were observed to be growing on sets of materials, beginning the decomposition process. These materials did not burn when tested by flame. The untreated materials showed no evidence of decay in the same timeframe and burned vigorously when challenged by flame.

Example 3

| (no retardant) | | |
| --- | --- | --- |
| Class | Compounds | Wt. % |
| Deliquescent | Potassium citrate | 80-95 |
| Polymer | Plant-based biopolymer | 2-5 |
| Plant nutrient | Ammonium sulfate | 0-20 |
| Wetting agent | Yucca powder | 0.5-1 |
| Rheological modifier | Seaweed powder | 0-1 |
| Compost accelerator | Saprophytic fungi and bacteria | 0.5-2 |
| Bio protectant | Activated charcoal | 0.5-2 |

The above mixture is added to water in the ratio of 0.2 to 0.5 pounds per gallon to create the spray mixture. The composition is sprayed on duff, dead and dormant brush, and grasses until the material is saturated. Treatment will accelerate the decomposition of the forest duff, dead plant matter, and fallen trees, thus reducing the available dry fuel that would otherwise burn when exposed to wildfire. Users can expect to see the accelerated decay evidence such as black spots and growth of fungus on the materials in 4-8 weeks. The mix with no retardant ingredient would be expected to accelerate composting of forest duff to dirt only, without excessive phosphate fertilizer effect, and no flame retardant effect other than fuel reduction via composting over time. Mixture will increase moisture by collection of atmospheric humidity. Store moisture by means of SABP (super absorbent bio polymers) add nutrients that accelerate bacteria and fungus growth and add saprophytic fungal and bacterial spores to supplement the native population of microorganisms. This treatment will accelerate the decomposition of forest duff, dead plant matter and fallen trees thus reducing the available dry fuel that would otherwise burn when exposed to wildfire.

Examples 4 through 12 present additional fuel decomposition compositions. The identified compounds were mixed with water to form an aqueous solution. The weight percentages shown in each table reflect the relative proportions of the compounds in the prepared aqueous solutions. The control group for each composition was water alone in the same amount as the aqueous solutions of Examples 4 through 12. The compositions of Examples 5 and 7 were adjusted to a pH of 8.6.

Aqueous compositions prepared with the compounds shown in Examples 4 through 12 were tested along with their respective water-alone controls by application to a container comprising organic matter (leaves and needles) typical of fine fuels, duff, etc. Observations were recorded after 14 days for Examples 4 through 8, 120 days for Examples 9 and 10, and 60 days for Examples 11 and 12. At the end of the respective test period, ignition of the organic matter was attempted.

It was observed that for all treatment groups (Examples 4 through 12) the organic matter remained saturated and ignition was not possible. The organic matter transitioned from dry matter at 4-5 mm in depth to a measured height of 0.5 to 1.5 mm and was in a state of decomposition, ranging from being covered with mycelium to a completely-decomposed wet humus.

In contrast, the organic matter of corresponding control (i.e., treated with water only), the organic material remained dry and flammable and ignited quickly. Moreover, the amount of organic matter remained relatively unchanged throughout the test period, with starting depth of 4-5 mm measured from the bottom of the container to the highest point as for the treated groups.

Example 4

| Class | Compounds | wt. % |
| --- | --- | --- |
| Water-absorbent polymer | Cornstarch | 4.5% |
| Deliquescent | Soy flour | 3% |
| Nutrients | Monosaccharide or disaccharide | 1.5% |
| Compost accelerators | Saprophytic microbes and spores | 0.05% |

Example 5

| Class | Compounds | Wt. % |
| --- | --- | --- |
| Water-absorbent polymer | Cornstarch | 4.5% |
| Deliquescent | Soy flour | 3% |
| Nutrients | Monosaccharide or disaccharide | 1.5% |
| Compost accelerators | Saprophytic microbes and spores | 0.05% |
| pH adjuster pH modified to 8.6 | Calcium Carbonate | 0.05% |

Example 6

| Class | Compounds | wt. % |
| --- | --- | --- |
| Water-absorbent polymer | Cornstarch | 9% |
| Deliquescent | Soy flour | 6% |
| Nutrients | Monosaccharide or disaccharide | 3% |
| Compost accelerators | Saprophytic microbes and spores | 0.1% |

Example 7

| Class | Compounds | Wt. % |
| --- | --- | --- |
| Water-absorbent polymer | Cornstarch | 9% |
| Deliquescent | Soy flour | 6% |
| Nutrients | Monosaccharide or disaccharide | 3% |
| Compost accelerators | Saprophytic microbes and spores | 0.1% |
| pH adjuster pH modified to 8.6 | Calcium carbonate | 0.05% |

Example 8

| Class | Compounds | Wt. % |
| --- | --- | --- |
| Water-absorbent polymer | Cornstarch | 9% |
| Deliquescent | Soy flour | 6% |
| Nutrients | Monosaccharide or disaccharide | 3% |
| Compost accelerators | Saprophytic microbes and spores | 0.05% |
| Super Absorbent Polymer | Potassium Polyacrylate | 0.5% |
| Deliquescent | Potassium citrate | 1% |

Example 9

| Class | Compounds | Wt. % |
| --- | --- | --- |
| Retardant | Mono Ammonium Phosphate | 11.25% |
| Deliquescent | Potassium citrate | 1.25% |
| Compost accelerators | Saprophytic microbes and spores | 0.025% |
| Super Absorbent Polymer | Potassium Polyacrylate | 0.5% |

Example 10

| Class | Compounds | Wt. % |
| --- | --- | --- |
| Retardant | Mono Ammonium Phosphate | 5% |
| Deliquescent | Potassium citrate | 1.25% |
| Compost accelerators | Saprophytic microbes and spores | 0.025% |
| Super Absorbent Polymer | Potassium Polyacrylate | 0.5% |

Example 11

| Class | Compounds | Wt. % |
| --- | --- | --- |
| Super Absorbent Polymer | Potassium Polyacrylate | 1% |
| Nutrients | Monosaccharide or disaccharide | 0.75% |
| Compost accelerators | Saprophytic microbes and spores | 0.05% |
| Deliquescent | Potassium citrate | 30% |

Example 12

| Class | Compounds | Wt. % |
| --- | --- | --- |
| Nutrients | Monosaccharide or disaccharide | 0.75% |
| Compost accelerators | Saprophytic microbes and spores | 0.05% |
| Deliquescent | Potassium citrate | 30% |

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternative are mutually exclusive, although the disclosure supports a definition that refers to only alternatives and "and/or."

As used herein, unless otherwise specified or unless the context otherwise clearly requires, "about" regarding a number or measurement means within 10% of the number or measurement.

As used herein, when the term "range" refers to integers, every integer from the minimum to the maximum values of such range is included. In addition, where multiple ranges are provided to describe a concentration or characteristic, such ranges may be combined.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

While the compositions and methods of this invention have been described in terms of preferred examples, it will be apparent to those of skill in the art that variations may be applied to the compositions and/or methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the present disclosure.

What is claimed is:

1. A fire retardant composition, comprising:
   at least one fire retardant, wherein the at least one fire retardant is in a range of 50-75 weight percent;
   at least one deliquescent, wherein the at least one deliquescent is in a range of 5-20 weight percent;
   at least one polymer, wherein the at least one polymer is in a range of 0.5-2 weight percent;
   at least one compost accelerator, wherein the at least one compost accelerator is in a range of 0.5-2 weight percent; and
   at least one wetting agent, wherein the at least one wetting agent is in a range of 0.1-1 weight percent.

2. The fire retardant composition of claim 1, wherein:
   the at least one fire retardant is in the range of 60-75 weight percent;
   the at least one deliquescent is in the range of 15-20 weight percent;
   the at least one polymer is in the range of 1-2 weight percent; and
   the at least one compost accelerator is in the range of 0.5-1 weight percent.

3. The fire retardant composition of claim 2, wherein:
   the at least one polymer is about 1.2 weight percent; and
   the at least one compost accelerator is about 0.5 weight percent.

4. The fire retardant composition of claim 1, the composition further comprising: at least one plant nutrient, wherein the at least one plant nutrient is in the range of 0.1-2 weight percent.

5. The fire retardant composition of claim 1, wherein the composition further comprises:
   at least one rheological modifier.

6. The fire retardant composition of claim 1, wherein the at least one polymer is an absorbent plant-derived polymer.

7. The fire retardant composition of claim 6, wherein the absorbent plant-derived polymer is cornstarch.

8. The fire retardant composition of claim 1, wherein the deliquescent includes soy flour, potassium citrate, or a combination thereof.

9. The fire retardant composition of claim 1, wherein the composition has a pH between 6 and 9.

10. The fire retardant composition of claim 1, wherein the composition further comprises a pH adjuster.

11. The fire retardant composition of claim 10, wherein an amount of the pH adjuster is added to the composition to adjust the pH to between 6 and 9.

12. A fire retardant mixture formed by mixing the composition of claim 1 with a solvent.

13. The fire retardant mixture of claim 12, wherein the composition has a pH between 6 and 9.

14. The fire retardant mixture of claim 12, wherein a pH adjuster is added to increase the pH of the composition to between 6 and 9.

15. The fire retardant mixture of claim 12, wherein the composition increases the rate of decomposition of organic matter.

* * * * *